Nov. 17, 1964 D. A. DANKO 3,157,348
NOZZLE DEVICE
Filed March 7, 1963
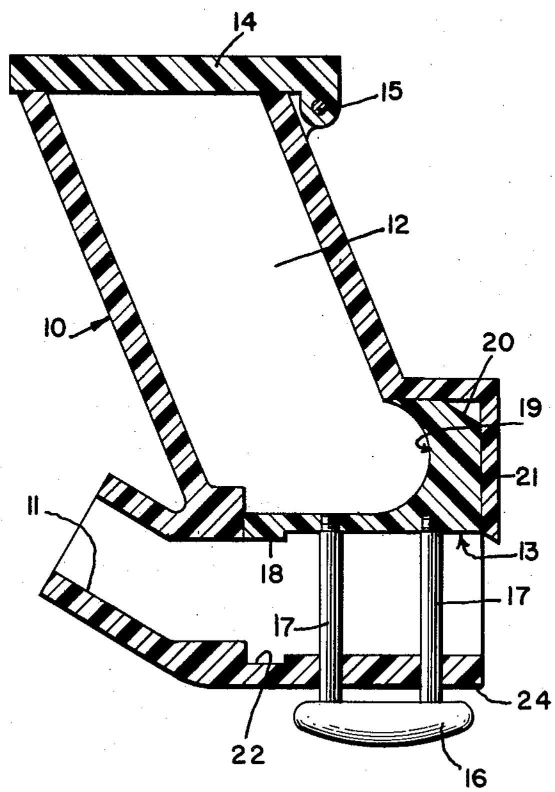
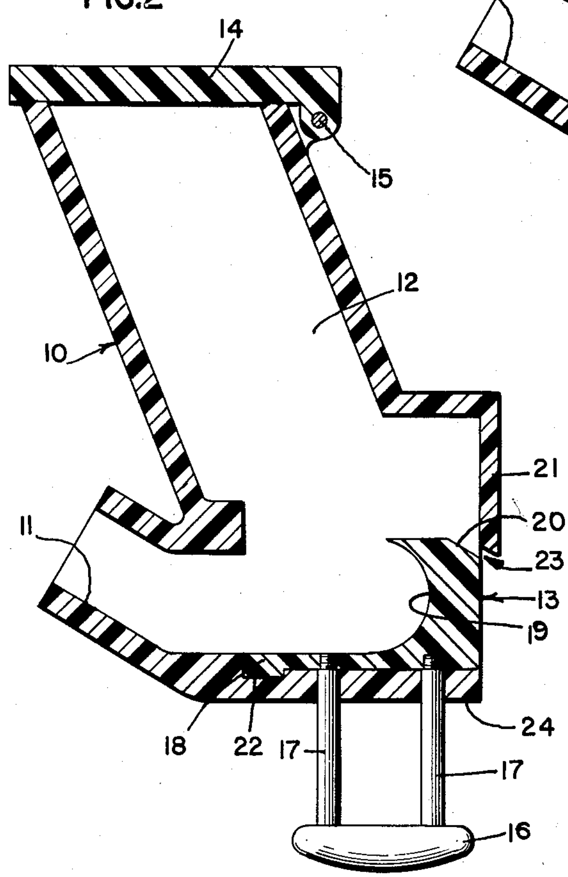
INVENTOR.
DANIEL A. DANKO
BY Lyon & Lyon
ATTORNEYS United States Patent Office 3,157,348

Patented Nov. 17, 1964

3,157,348
NOZZLE DEVICE

Daniel A. Danko, 8200 Mason Ave., Canoga Park, Calif.

Filed Mar. 7, 1963, Ser. No. 263,553
6 Claims. (Cl. 239—316)

The present invention relates to a device adapted to be attached to nozzles, faucets, and the like. More particularly, the present invention relates to a device of this character which is adapted to function both to cause a mixing of fluid issuing from the nozzle to which it is attached with a material contained within the device and to cause this mixture to be expelled from the device as a high velocity stream. The device of the present invention is also adapted to permit the nozzle to which it is attached to function in a normal manner when it is not desired that the device perform its mixing and stream acceleration functions.

It has been found desirable, for several reasons, to cause foaming or bubbling at the surface of bodies of liquid. For example, foam or bubble producing compositions are often added to public fountains and the like in order to produce decorative and aesthetically pleasing effects. In addition, it is a well known practice to add foam or bubble producing compositions to bath water to produce an effect popularly known as "bubble bath."

One of the principal deficiencies of conventional methods of using foam or bubble producing compositions for the purposes previously described is that the full capability of the foam or bubble producing composition to produce foam or bubbles is not utilized. This results in substantial amounts of these compositions being wasted.

Thus, it is a principal object of the present invention to provide a device which permits maximum utilization of the foam or bubble forming capabilities of foam or bubble forming compositions.

It is a further object of the present invention to provide a device which is capable of causing a fluid stream to mix with a substance contained in the device and cause this mixture to leave the device as a relatively high velocity stream.

It is another object of the present invention to provide an apparatus capable of performing the functions of causing a fluid stream to mix with another substance and accelerating the stream.

It is still a further object of the present invention to provide a device capable of performing the functions of causing a fluid stream to mix with another substance and accelerating the fluid stream, which device may be selectively adjusted such that it will perform these functions and such that it will permit the fluid stream to pass substantially unchanged.

Other objects and advantages of the present invention, it is believed, will be apparent from the following detailed description of specific embodiments thereof when read in connection with the drawings.

Briefly, the present invention comprises a device which may be attached to a nozzle, faucet or the like. In its preferred embodiment, the device of the present invention comprises a body means capable of being attached to a nozzle and a movable means mounted in said body means which movable means is capable of being adjusted so as to permit a fluid stream to pass therethrough substantially unchanged or to cause the fluid stream to mix with a substance contained in the device and cause this mixture to be expelled from the device at relatively high velocity. In this preferred embodiment, the movable means is mounted for sliding movement.

Referring now to the drawings, FIGURE 1 illustrates the device of the present invention adjusted such that a fluid stream passing therethrough would be substantially unchanged.

FIGURE 2 illustrates the device of the present invention adjusted such that a fluid passing therethrough would be caused to mix with a substance contained in the device and then expelled from the device at relatively high velocity.

As shown in the drawings, the device of the present invention comprises a body portion which is indicated generally by numeral 10. Body 10 is provided with a conduit 11 which is adapted to be attached to a nozzle or faucet, e.g., by a threaded or bayonet connection. A movable means 13 is mounted in body 10. Conduit 11 is also provided with lip 24.

When movable means 13 is in the position illustrated in FIGURE 1, it cooperates with body 10 to form chamber 12. The upper end of chamber 12 is closed by a suitable lid 14 which is mounted on hinge 15. Movable means 13 is also provided with handle 16 which is mounted on struts 17. Movable means 13 is further provided with projection 18, curved portion 19 and bevelled portion 20. Bevelled portion 20 is located adjacent lip 21 of body portion 10. Body portion 10 is also provided with recess 22 which corresponds to projection 18.

When movable means 13 is in the position illustrated in FIGURE 2, bevelled portion 20 thereof cooperates with lip 21 to form opening 23. In this position, projection 18 and recess 22 engage each other and function to substantially prevent leakage between body 10 and movable means 13. However, projection 18 and recess 22 may be omitted if desired.

In operation, the device is caused to assume the position illustrated in FIGURE 1 by pushing handle 16 upwardly to close the lower end of chamber 12. A suitable amount of foam or bubble forming composition is then added to chamber 12. Chamber 12 is then closed by closing lid 14.

The device is then attached to a suitable source of fluid by means of conduit 11. For example, conduit 11 may be attached to the faucet in a bathtub. Water may then be allowed to fill the bathtub to a suitable level by causing water to flow through the faucet and then through conduit 11 and finally out of the opening defined by lips 21 and 24.

When the bathtub has been filled to the desired level, movable means 13 is caused to assume the position illustrated in FIGURE 2 by pulling downwardly on handle 16. When this is done, the water entering conduit 11 is caused to come into contact with curved portion 19 of movable means 13. Curved portion 19 causes the water to change direction and to be forced upwardly into chamber 12 wherein it comes in contact with the foam forming substance, e.g., bubble bath. For a short period of time, relatively little water flows out of the device and chamber 12 is filled. When sufficient pressure has been built up within chamber 12, the water, which is now mixed with the bubble bath, is forced through opening 23. Since opening 23 is relatively small, the velocity of the liquid passing therethrough is relatively high.

When the high velocity stream issuing from opening 23 impinges upon the body of water in the bathtub, extremely active and vigorous bubble formation occurs. When the desired amount of bubbles have been obtained, the water may be turned off and movable means 13 returned to the position illustrated in FIGURE 1.

While specific reference has been made to the use of the device of the present invention as an attachment on a bathtub faucet in the foregoing description, it will be readily apparent to those skilled in the art that this device may be used in a wide variety of environments, e.g., public fountains, swimming pools, etc.

Furthermore, it will also be readily apparent to those skilled in the art that the specific embodiment which has been described in detail may be modified in various ways without departing from the scope of the present invention.

For example, movable means 13 may be mounted for movement in any suitable manner, e.g., pivotally, rather than that described in detail herein. In addition, bevelled edge 20 could be rounded or of any other suitable configuration which would cooperate with lip 21 to form a relatively small opening and to direct the high velocity stream issuing from the device in the desired direction. Still further, depending upon the amount of leakage which is tolerable between the lower portion of movable means 13 and lip 24, any suitable means may be used to effect a seal between these members when the device is in the position illustrated in FIGURE 2, or a seal means may be omitted entirely.

Having fully described the present invention, it is to be understood that it is not to be limited to the details set forth, but is of the full scope of the appended claims.

I claim:

1. An apparatus comprising a casing, said casing having an inlet and an outlet, said inlet and said outlet being in communication with each other, a portion of said casing comprising a chamber, said chamber being closed at a first end by a closure means and being open at a second end; and a movable means, said movable means being mounted for movement such that it is capable of closing the second end of said chamber to form a completely closed chamber, said movable means also being capable of movement such that it simultaneously opens the second end of said chamber whereby said chamber is brought into communication with said outlet and renders the size of said outlet substantially smaller than the size of said inlet.

2. An apparatus comprising a casing, said casing having an inlet and an outlet, said inlet and said outlet being in communication with each other, a portion of said casing comprising a chamber, said chamber being closed at a first end by a closure means and being open at a second end; and a movable means, said movable means being mounted for movement such that it is capable of closing the second end of said chamber to form a completely closed chamber, said movable means also being capable of movement such that it simultaneously opens the second end of said chamber whereby said chamber is in communication with said inlet and renders the size of said outlet substantially smaller than the size of said inlet, said movable means being provided with a curved surface, said curved surface being capable of directing fluid into said chamber when said movable means is moved such that the second end of said chamber is open.

3. An apparatus comprising a casing, said casing having an inlet and an outlet, said inlet and said outlet being in communication with each other, a portion of said casing comprising a chamber, said chamber being closed at a first end by a closure means and being open at a second end, a lip extending from said second end, said lip forming a portion of said outlet; and a movable means, said movable means being mounted for movement such that it is capable of closing the second end of said chamber, said movable means also being capable of movement such that it simultaneously opens the second end of said chamber whereby said chamber is brought into communication with said inlet and renders the size of said outlet substantially smaller than the size of said inlet.

4. An apparatus comprising a casing, said casing having an inlet and an outlet, said inlet and said outlet being in communication with each other, a portion of said casing comprising a chamber, said chamber being closed at a first end by a closure means and being open at a second end, a lip extending from said second end, said lip defining a portion of said outlet; and a movable means, said movable means being mounted for sliding reciprocating motion toward and away from the second end of said chamber, said movable means being mounted for movement such that it is capable of closing the second end of said chamber to form a completely closed chamber, said movable means also being capable of movement such that it simultaneously opens the second end of said chamber whereby said chamber is brought into communication with said inlet and renders the size of said outlet substantially smaller than the size of said inlet, the surface of said movable means which functions to close the second end of said chamber being provided with a curved portion, said curved portion being capable of directing fluid into said chamber when said movable means is moved such that the second end of said chamber is open.

5. The apparatus of claim 4 wherein said movable means is provided with a handle.

6. The apparatus of claim 4 wherein said movable means and said casing are provided with a corresponding tongue and groove which are brought into engagement when said movable means is moved to open the second end of said chamber.

References Cited in the file of this patent

UNITED STATES PATENTS

| | | |
|---|---|---|
| 1,288,824 | Burns | Dec. 24, 1918 |
| 1,343,490 | Albertson | June 15, 1920 |
| 1,476,090 | Lipsner et al. | Dec. 4, 1923 |
| 1,532,809 | Girard | Apr. 7, 1925 |
| 1,687,085 | Dow | Oct. 9, 1928 |
| 1,745,323 | Coe et al. | Jan. 28, 1930 |
| 2,199,478 | Bruzaud | May 7, 1940 |
| 2,744,789 | Sutton | May 8, 1956 |
| 3,003,518 | Tisdale | Oct. 10, 1961 |